United States Patent

[11] 3,538,930

| | | | | |
|---|---|---|---|---|
| [72] | Inventor | Slawomir Kowalski Rockaway, New Jersey | | |
| [21] | Appl. No. | 701,410 | | |
| [22] | Filed | Jan. 29, 1968 | | |
| [45] | Patented | Nov. 10, 1970 | | |
| [73] | Assignee | Morotta Valve Corporation Boonton, New Jersey a corporation of New Jersey | | |

[54] DIFFERENTIAL PRESSURE REGULATOR FOR DUAL SHUT-OFF VALVES
7 Claims, 2 Drawing Figs.

[52] U.S. Cl............................................. 137/81,
    137/116.3, 137/116.5, 137/505.25, 137/613
[51] Int. Cl.........................................F16k 31/145
[50] Field of Search............................... 137/81,
    505.11, 505.25, 505.41, 613, 608, 512.1;
    251/325(Ring Digest)

[56] References Cited
UNITED STATES PATENTS

| 881,234 | 3/1908 | Fusch | 137/512.1 |
|---|---|---|---|
| 975,838 | 11/1910 | Derby | 137/505.11 |
| 2,529,605 | 11/1950 | Gustafson | 137/608X |
| 2,645,450 | 7/1953 | Chessman | 251/325X |
| 2,712,324 | 7/1955 | Land | 137/613X |
| 3,147,761 | 9/1964 | Lecocr | 137/81 |
| 3,236,250 | 2/1966 | Colombo | 137/81 |
| 3,253,608 | 3/1966 | Davis | 137/505.25X |

Primary Examiner—Harold W. Weakley
Attorney—Sandoe, Neill, Schottler and Wikstrom ABSTRACT: This specification discloses a pressure regulator having a pressure-responsive slide valve for controlling the flow of high-pressure gas into the regulator and for venting the gas above a maximum value. The slide valve is operated by a movable wall of a pressure chamber, specifically a diaphragm, and the venting is effected through a passage of the slide valve which leads through the diaphragm to the side remote from the valve. The diaphragm is loaded by the combined pressure of a spring and a fluid loading pressure, such as sea water, which enters the regulator through an open port so that the pressure changes as the depth of immersion of the regulator in the sea water increases or decreases. By having the loading pressure chamber of the regulator open to the sea water, the regulator is adjusted automatically for changes in environment. The regulator uses check valves comprising O-rings in circumferential grooves to which gas is supplied through radial ports which introduce the gas under the O-rings. This lifts the O-rings for escape of gas but the O-rings settle into grooves to prevent flow in the reverse direction.

Patented Nov. 10, 1970

3,538,930

INVENTOR
Sławomir Kowalski
BY Randol, Neill,
Schöttler & Wikstrom
ATTORNEYS.

DIFFERENTIAL PRESSURE REGULATOR FOR DUAL SHUT-OFF VALVES

RELATED APPLICATIONS

The construction of the slide valve of this application is related to the disclosures in applications Ser. No. 636,574, filed May 8, 1967 and Ser. No. 701,213, filed Jan. 29, 1968.

BRIEF DESCRIPTION OF THE INVENTION

This is an improved regulator for receiving gas at high pressure and delivering it at a controlled reduced pressure. The regulator can be adjusted manually to change the output pressure level; and it also has provision for automatically changing the outlet pressure in accordance with changes in the ambient pressure at the environment where the regulator is being used.

In the preferred embodiment of the invention, the automatic change in the outlet pressure level is effected by exposing the load side of the diaphragm to the pressure of sea water surrounding a diver or a vehicle at a particular depth at which the diver or vehicle is immersed. Other automatic change in loading can be effected.

The manual adjustment and the automatic adjustment of the outlet pressure are preferably independent of one another. In the illustrated construction, the manual adjustment is performed by changing the physical position of parts of a slide valve mechanism, for example, changing the port locations; and the automatic adjustment is effected by changes in the pressure in the loading chamber.

This invention also includes check valves comprising O-rings set in circumferential grooves into which gas flows under the O-rings. This stretches the O-ring to a larger circumference to permit flow of gas out of the groove. With a reduction of pressure under the ring, the ring compresses into its groove and back flow is prevented.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views.

DETAILED DESCRIPTION OF THE PREFERRED EMBODIMENT

Figure 1:
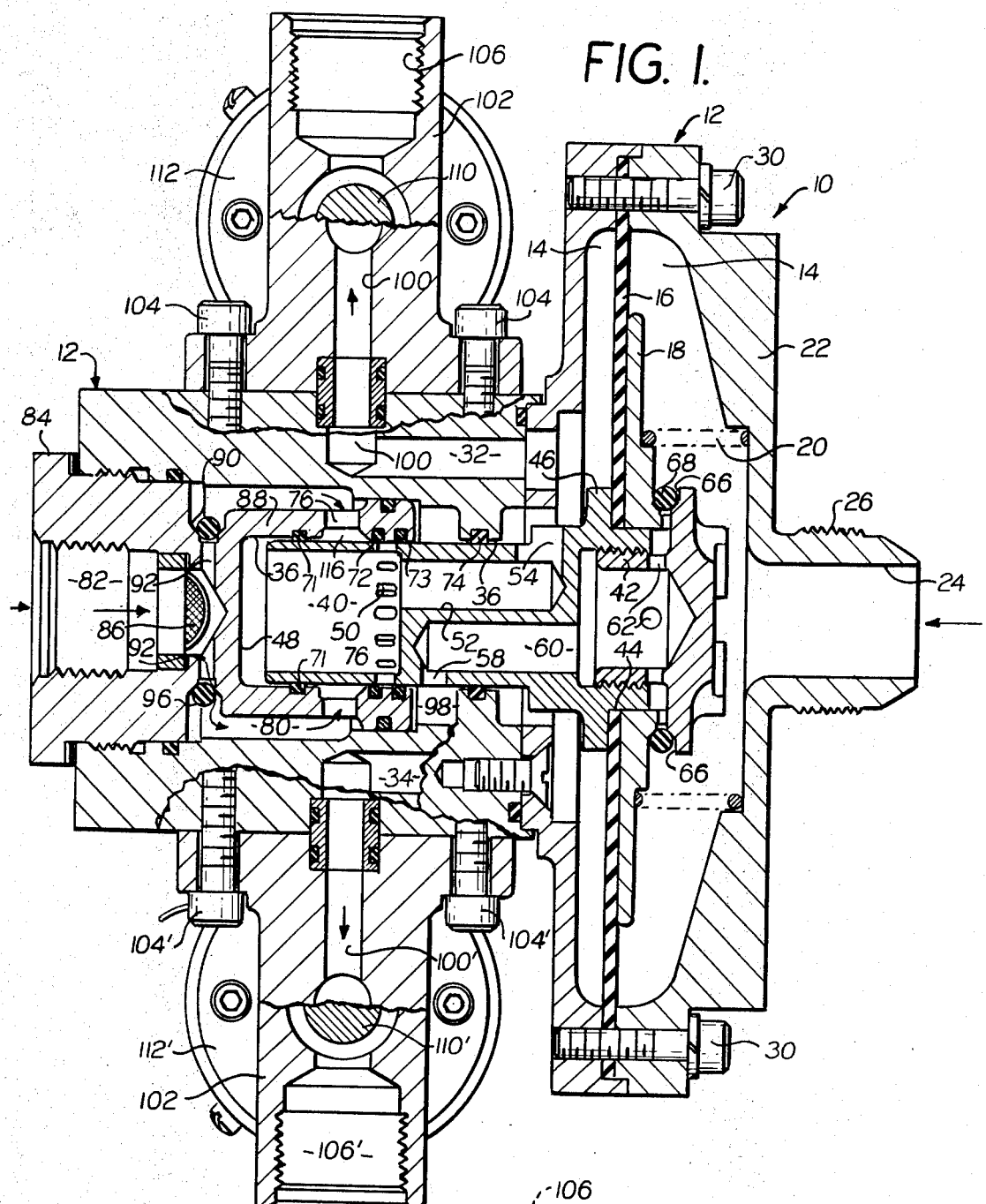
FIG. 1 is a sectional view through a regulator made in accordance with this invention.

This invention includes a regulator 10 having a composite housing 12 which includes a chamber 14 with a movable wall partitioning the chamber into two parts, the movable wall comprising a diaphragm 16.

A diaphragm plate 18 is secured to the center portion of the diaphragm 16 and is preferably loaded by a spring 20 compressed between the plate 18 and an end wall 22 of the housing 12. This end wall 22 has an opening 24 for admitting pressure fluid into the right-hand or reference pressure side of the chamber 14. Around the opening 24 there are threads 26 for receiving a fitting or tube connection if the access to the loading fluid is at a remote location. The regulator shown in the drawing is intended for use with sea water admitted through the opening 24 to the reference pressure side of the diaphragm 16, and the pressure of the sea water increases or decreases with changes in the depth of immersion of a diver, submarine or other diving vehicle with which the regulator is used.

The end wall 22 is clamped to the adjacent part of the housing 12 by a circle of screws 30, and the circumference of the diaphragm 16 is clamped, by these screws 30, between the end wall 22 and the adjacent housing structure to which the end wall is secured. The left-hand or reduced pressure side of the chamber 14 has two outlet ports 32 and 34 and has a bore 36 which provides an inlet port for the flow of gas into the reduced pressure side of the chamber 14.

A slide valve 40 fits into the bore 36 and has its right-hand end connected with the hub of the diaphragm plate 18 by threads 42. There is an opening 44 through the center of the diaphragm 16. The end of the slide valve 40 extends through this opening and so does the hub of the diaphragm plate 18 which contains the threads 42. There is a flange 46 on the slide valve 40 in position to clamp the inner edge portion of the diaphragm 16 against the back of the diaphragm plate 18.

The slide valve 40 is essentially a sleeve. It is completely open at its left-hand end; this end confronting a wall 48 which closes the end of the counterbore 36. The slide valve 40 has radial ports 50 opening through its circumference at a location spaced from the open left-hand end of the slide valve. The open space with which these ports 40 communicate in the slide valve has a passage 52 extending forwardly through the slide valve to a port 54 which opens into the reduced pressure side of the chamber 14.

The slide valve 40 also has a port 58 opening through its circumference at a location spaced axially for a short distance from the circle of ports 50. This port 58 opens into a passage 60 in the slide valve communicating with the open interior of the hub of the diaphragm plate 18; and there are radial ports 62 leading from the interior of the diaphragm plate hub into a circumferential groove 66 in the hub of the diaphragm plate.

An O-ring 68 in the circumferential groove 66 serves as a check valve for the ports 62. When pressure under the O-ring is greater than the pressure on the reference pressure side of the chamber 14, the pressure under the O-ring 68 stretches the O-ring sufficiently to permit the excess pressure to escape. When the pressure in the ports 62 is less than that above the O-ring 68, the outside pressure on the O-ring forces the O-ring down against the bottom of the circumferential groove 66, which preferably is tapered, and this makes the O-ring seal the ports 62 so that it acts as a check valve to prevent flow of fluid from the reference pressure side of the chamber 14 into the vent ports 62.

There are other O-rings 71, 72, 73 and 74 in axially spaced circumferential grooves in the wall of the bore 36. Between the O-ring 71 and 72 there are ports 76 opening through the side of the bore 36 for admitting high pressure gas into the slide valve 40 through the valve ports 50 when the slide valve moves into a position in which the ports 50 are to the left of the O-ring 72.

The ports 71 communicate with an annular chamber 80 to which high pressure gas is admitted through an inlet port 82 in a fitting 84 screwed into the end of the housing 12 remote from the chamber 14.

The fitting 84 contains a filter 86 and it has an extension 88 projecting into the housing 12 and providing a part of the length of the bore 36 in which the valve 40 slides.

There is a circumferential groove 90 in the fitting 84 with radial ports 92 leading from the port 82 into the groove 90. An O-ring 96 is located in the circumferential groove 90 and serves as a check valve to prevent back flow toward the port 82, the operation being similar to that of the O-ring 68, already described. Between the O-rings 73 and 74, there is an annular clearance 98 with which the port 58 communicates. When the slide valve 40 moves forward far enough to locate the ports 50 to the right of the O-ring 73, then the interior of the slide valve 40 is in communication through the ports 50, clearance 98, and port 58 with the passage 60 leading to the vent ports 62.

When the slide valve 40 is in such a position that the ports 50 are sealed at both sides by the O-rings 72 and 73, then the slide valve is in closed position. The purpose of having two O-rings 72 and 73 is to permit the use of larger and elongated ports 50 which would not be possible without the use of an O-ring of excessive size if a single ring were used to seal these ports when the slide valve was in closed position.

The advantage of the elongated ports 50 is that they have greater cross section than round ports having a diameter equal to the circumferential width of the elongated ports 50. The ports 50 can be made as large as necessary for any desired rate of flow by merely extending their axial length, and correspondingly extending the axial spacing of the O-rings 72 and 73. No increase in the size of the O-rings is necessary, regardless of the length of the elongated ports 50. This increased cross section of the ports 50 could not be obtained by using round ports because a round port extending for any substantial circumferential arc has the disadvantage that it leaves the O-ring unsupported for a distance which results in collapsing of the O-ring into the port. The ports 50 have their circumferential extent limited to the extent necessary to provide the support required for the O-rings 72 and 73 to span the ports. This, of course, depends upon the hardness of the O-rings.

The port 32 communicates with a passage 100 leading upward through the top wall of the housing 12 and through a valve housing 102 which is connected to the housing 12 by fastening means comprising screws 104 so that the valve housing is, in effect, a part of the composite housing 12.

Figure 2:
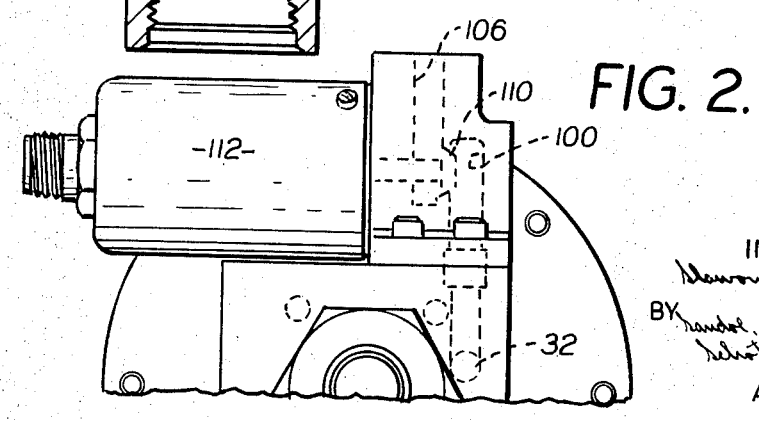
FIG. 2 is a fragmentary end elevation, on a reduced scale, of a part of the regulator shown in FIG. 1.

The passage 100 communicates with an outlet passage 106 at the top of the valve housing 102 and there is a poppet valve 110 (FIG. 2) which contacts with a seat located between the passages 100 and 106. When this poppet valve 110 is closed, flow from the passage 100 to the passage 106 is shut off. The valve 110 is operated by an actuator comprising a magnetic coil for moving the valve in one direction and a spring for moving it in the other direction.

There is another valve housing 102' connected to the lower part of the housing 12 by screws 104', and there are passages 100' and 106' commanded by a poppet valve 110' leading from the passage 34.

The operation of the apparatus is as follows:

Air or other gas which is to be supplied at regulated pressure enters the housing 12 through the port 82 and flows through the radial ports 92, past the O-ring check valve 96, through the annular chamber 80 and ports 76 into a circumferential groove 116 which forms a chamber around the slide valve 40. With the slide valve in the position shown in FIG. 1, the O-rings 71 and 72 prevent the air from traveling any further than to the chamber formed by the circumferential groove 116.

When the pressure in the chamber 14 on the left-hand side of the diaphragm 16 drops, or the pressure in the chamber 14 on the right-hand side of the diaphragm 16 rises as the result of water at high pressure entering the regulator through the opening 24, the slide valve 40 moves to the left in FIG. 1 and shifts the ports 50 into communication with the annular chamber provided by the circumferential groove 116. Air then travels through the ports 50 and along the hollow interior of the slide valve 40 to the port 54 which leads into the chamber 14 on the left-hand side of the diaphragm 16. Flow of air continues until the pressure builds up on the left-hand side of the diaphragm 16 to a value sufficient to overcome the pressure of the spring 20 and the pressure of the water. This increase in pressure moves the slide valve 40 back into position with its ports 50 located between the O-rings 72 and 73.

In order for air to flow from the chamber 14 on the left-hand side of the diaphragm 16, one or both of the poppet valves 110 and 110' must be open. Thus the slide valve 40 controls the flow of air to the extent necessary to maintain the desired pressure in the chamber 14 and the passages 32 and 34, but the poppet valves 110 and 110' determine whether the apparatus delivers any air.

If the ambient water pressure to which the diaphragm 16 is exposed through the opening 24 decreases, then the pressure on the left-hand side of the diaphragm 16 moves the slide valve 40 toward the right and shifts the ports 50 to the right of the O-ring 73 so that they are in communication with the clearance 98. Air from the chamber 14 on the left-hand side of the diaphragm 16 then vents through the port 54, ports 50, clearance 98, port 58, passage 60, ports 62, and past the O-ring check valve 68 into the chamber 14 on the right-hand side of the diaphragm 16. This venting continues until the excess pressure on the left-hand side of the diaphragm 16 is relieved.

Although the invention is intended for regulating the pressure in accordance with the ambient pressure of sea water entering the housing through the opening 24, it will be apparent that the apparatus can also be used for regulating pressure in response to changes in loading pressure supplied through the opening 24 by other means and for other purposes. The invention is intended for regulating air pressure, but can be used for regulating pressure of other gases.

The preferred embodiment of the invention has been illustrated and described, and the invention is defined in the claims.

I claim:

1. A pressure regulator including a housing, an inlet port for high-pressure gas, an outlet port for gas at reduced pressure, a vent, valve means in the regulator movable into different positions for controlling the flow of gas through the regulator, and the valve means being movable into one position for controlling flow to the vent, a reduced pressure chamber on the downstream side of the valve means, said valve means including orifices that are covered and uncovered in different positions to put the chamber in communication selectively with the inlet port and the vent, a movable wall of the chamber of larger diameter than the valve means for moving the valve means into its flow-control and venting positions, the movable wall being exposed on one side to the gas at reduced pressure and on the other side to an ambient water pressure that varies with the depth of immersion at which the pressure regulator is used, and the vent including a passage leading from the chamber on the water side of the movable wall to the ambient water surrounding the equipment in which the regulator is used whereby the loading on the movable wall is adjusted automatically with changes in the depth of immersion in the water, characterized by the vent passage opening through the movable wall, said vent passage being put into communication with the chamber on the side of the movable wall opposite the water when the valve means are in venting position, and a check valve in the vent passage in series with said valve means and oriented to open for flow of fluid toward the water pressure side of the diaphragm and urged toward closed position by the water pressure, said check valve preventing flow of water into the gas chamber whereby gas from the regulated pressure side of the diaphragm vents into the water on the other side of the diaphragm when gas pressure on the gas pressure side of the movable wall exceeds the water pressure on the other side by a predetermined value.

2. The pressure regulator described in claim 1 characterized by the check valve comprising an O-ring seated in a circumferential groove having ports opening through the bottom of the groove and constituting part of the passage through which gas vents from the regulated pressure side of the diaphragm to the water pressure side of the diaphragm.

3. A pressure regulator including a housing, an inlet port for high-pressure gas, an outlet port for gas at reduced pressure, valve means in the regulator for controlling the flow of gas through the regulator, a chamber on the downstream side of the valve means, a movable wall of the chamber exposed on one side to the gas at reduced pressure and on the other side to a reference pressure, a passage through the movable wall, the valve means including a slide valve secured to the movable wall and movable as a unit therewith, a bore in which the slide valve moves, the bore and slide valve having passages therein which are selectively brought into communication with one another as the slide valve moves in the bore, characterized by O-rings in the bore in position to seal said passages from one side when the passages in the valve and bore are not in position for communication with one another, the valve having one passage therein that puts the regulated pressure side of the chamber in communication with the inlet port and having another passage that puts the regulated pressure side of the chamber in communication with the passage through the movable wall.

4. The pressure regulator described in claim 3 characterized by two different outlet ports from the regulated pressure chamber, a separate valve commanding each of said outlet ports, and a separate electromagnetic actuator for each of said separate valves.

5. The pressure regulator described in claim 3 characterized by one of the passages in the slide valve having one end opening through the circumference of the slide valve and its other end opening through the end of the slide valve remote from the movable wall, and the other of said passages in the slide valve having one end opening through the circumference of the slide valve and its other end opening through an end of the slide valve that communicates with the opening through the movable wall to the side of the movable wall remote from the slide valve.

6. A pressure regulator including a housing, an inlet port for high-pressure gas, an outlet port for gas at reduced pressure, valve means in the regulator for controlling the flow of gas through the regulator, a chamber on the downstream side of the valve means, a movable wall of the chamber exposed on one side to the gas at reduced pressure and on the other side to a reference pressure, the valve means including a slide valve secured to the movable wall and movable as a unit therewith, a bore in which the slide valve moves, the bore and slide valve having passages through the circumference thereof which are selectively brought into communication with one another as the slide valve moves axially in the bore, said passages including a port opening through the circumference of the slide valve, O-rings around the slide valve and sealing the clearance between the slide valve and the bore in which it slides, said O-rings being axially spaced on opposite sides of the port opening through the circumference of the slide valve when the slide valve is in a first and closed position, an inlet passage of the regulator communicating with the passage through the circumference of the bore at a location axially beyond both of said O-rings, the slide valve being movable by the movable wall from its first position to a second position that locates its port opening at least partially beyond the O-ring that is nearer to the bore passage that communicates with the inlet passage for controlling communication between the inlet passage and a passage within the slide valve leading to the chamber on the side of the movable wall opposite said reference pressure side of the movable wall, the slide valve being also movable into a third position that locates its port opening beyond both of the O-rings in the opposite direction from the second position, a vent having a passage that opens through the circumference of the slide valve on the same side of the O-rings as said port opening when the slide valve is in its third position, the vent passage extending through the slide valve independent of said port opening, and an O-ring in series with the vent passage in position to serve as a check valve against back flow into the vent passage.

7. The pressure regulator described in claim 6 characterized by there being a plurality of angularly spaced ports around the circumference of the slide valve, each of the ports being elongated in a direction parallel to the axis of the slide valve, and the O-rings being spaced axially far enough to seal the slide valve on both sides of the elongated ports when said ports are located symmetrically with respect to said O-rings.